May 4, 1954
W. SCHMIDT
2,677,295
TRACER DEVICE FOR CONTOUR MACHINING, PARTICULARLY
FOR LATHE WORK ON RAW CERAMIC OR
SIMILARLY MACHINABLE MATERIALS
Filed Oct. 7, 1952
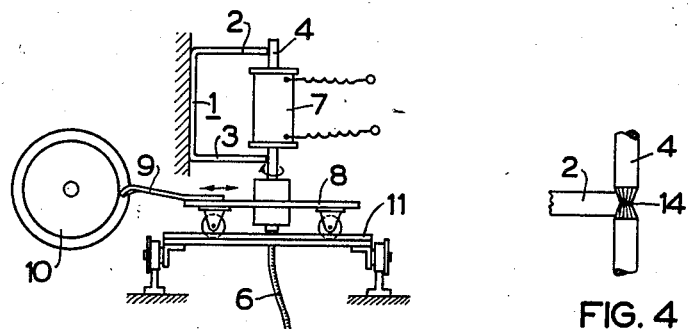
FIG. 2
FIG. 4
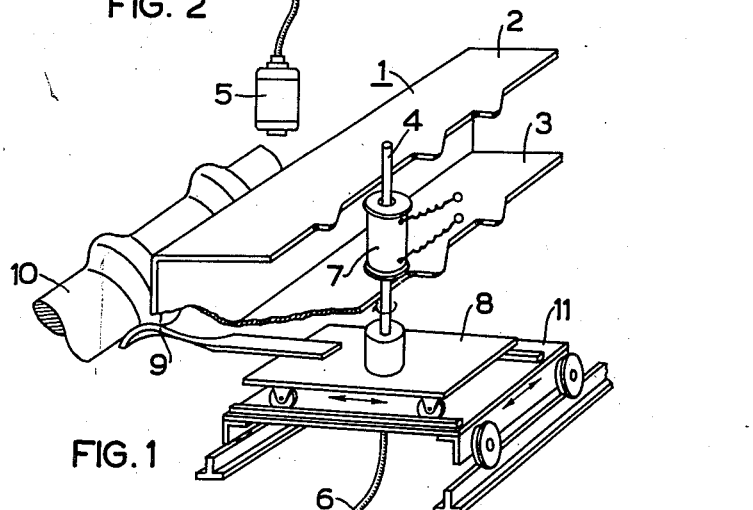
FIG. 1
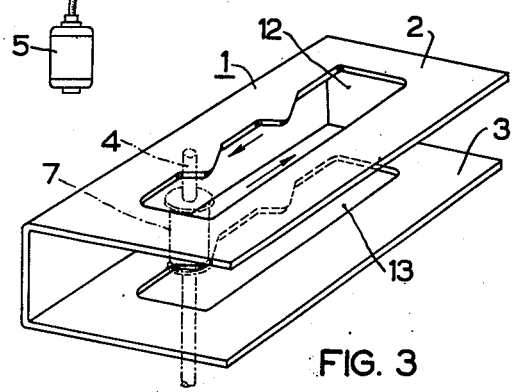
FIG. 3
Inventor:
Willi Schmidt
By
C. W. Avery
Attorney

Patented May 4, 1954

2,677,295

UNITED STATES PATENT OFFICE 2,677,295

TRACER DEVICE FOR CONTOUR MACHINING, PARTICULARLY FOR LATHE WORK ON RAW CERAMIC OR SIMILARLY MACHINABLE MATERIALS

Willi Schmidt, Rodach (Bay), Germany, assignor to Siemens-Schuckertwerke Aktiengesellschaft, Berlin, Siemensstadt, Germany, a corporation of Germany Application October 7, 1952, Serial No. 313,554

Claims priority, application Germany November 16, 1951

3 Claims. (Cl. 82—14)

My invention relates to tracer devices for the contour machining of work pieces under control by a master pattern represented by a tracer-guiding contour of a template, and, in one of its particular aspects, to tracer devices for the contour turning of raw, i. e. unfired, ceramic materials or other similarly machineable materials.

Bodies of such materials are machined by turning tools, for instance, when shaping ceramic insulators for electrical purposes into accurate bodies of revolution prior to firing the material. Manual work by qualified skilled labor has heretofore been necessary for such machining operations.

It is an object of my invention to eliminate this necessity and to provide a tracer device which is capable of controlling the tool with attendance by unskilled labor, which automatically secures an accurate machining of a body of revolution into the desired shape and in adaptation to the particular machining properties of the material, and which has a design of utmost simplicity well suitable for lathes of the kind used for work on unfired ceramic or similarly machineable materials.

According to my invention, I incorporate into a tracer device a magnetic circuit that provides a magnetic force holding the tool-controlling tracer member against the guiding contour of the pattern template. According to a more specific feature of my invention, the tracer member and the template consist of magnetizable material, preferably iron or steel, and are electromagnetically energized by a magnet coil mounted on one of the two members.

Template and tracer are preferably so arranged that the magnetic forces simultaneously provide for the tracing of the template contour, the cutting pressure of the tool, and the longitudinal and transversal feed movements of the tool relative to the work piece.

According to other features of my invention, the tool-controlling tracer consists of a driven revolvable member, such as a guide pin, which rolls along the template contour and may be journalled directly on the tool support that is transversely movable on a longitudinally displaceable carriage or slider. Preferably, the template may consist of a substantially U-shaped channel structure having two congruent pattern contours in its respective parallel portions contacted by the tracer at two axially spaced points of the tracer. The pattern contour is preferably part of a closed curve for automatically guiding the tracer, and hence the tool, to its starting position at the end of each cutting run. The revolving tracer, in rolling engagement with the template contour, is driven by a transmission suitable to permit the tracer the desired follower travel. The transmission may consist of a flexible shaft or a counter gearing with sliding gears.

Other objects and more specific features of the invention will be apparent from the following description of the embodiments exemplified by the drawing in which:

Fig. 1 is a perspective view of a tracer device and shows also a turning tool controlled by the device and a work piece to be machined by the tool;

Fig. 2 is a lateral elevation of the same tracer device;

Fig. 3 shows perspectively a modified embodiment of a template of the tracer device; and Fig. 4 shows part of the template and part of the pertaining tracer in a modified design.

The tracer device shown in Figs. 1 and 2 has a stationarily mounted template member 1 of magnetizable material such as steel. The template member consists essentially of a channel structure of a substantially U-shaped cross section. The two parallel portions 2 and 3 of the channel structure form the pattern plates proper of the template. The longitudinal edges of these plates have a contoured edge whose shape corresponds to the longitudinal contour of the work piece to be machined. The two congruent edge contours of the template are contacted by a revolvable tracer member 4 consisting of a pin of circular cross section. The tracer pin is driven by a motor 5 through a flexible shaft 6. The motor may be stationarily mounted and the flexible shaft may have the length required for the tracer member to pass through its entire range of travel. The tracer pin 4 consists of magnetizable material such as iron or steel and carries an electromagnet coil 7. The tracer member 4 and the channel structure of the template 1 form together a closed magnetic circuit. Consequently, when the coil 7 is electrically excited, the magnetic flux path extending through the tracer member and the template provides a magnetic force which holds the tracer member against the contour edges.

The tracer pin 4 is revolvably mounted on a support 8 which is movable in the transverse direction relative to the axis of the work piece. In the illustrated embodiment, the support 8 consists of the tool support of the lathe. That is, this support carries the cutting tool 9 for turning the work piece 10 into an accurate body of revolution in accordance with the pattern determined by the contour edges of the template. The tool support 8 is movable on a longitudinally movable base 11 which is shown designed as a carriage whose rollers engage longitudinal rails extending along the lathe.

When the tracer member 4 is driven by motor 5 through the flexible shaft 6, it rolls along the pattern contours of the template while being firmly forced against the edges of the template by the magnetic field of coil 7. By virtue of the frictional engagement thus secured, the revolving tracer pin travels along the template edges and correspondingly displaces the tool carrier 8 in transversal and longitudinal directions as determined by the curvature of the template contours. Consequently, the magnetic force provides not only the cutting pressure for the tool 9 but also effects the transversal movement of the tool support 8 and the longitudinal travel of the carriage 11. The available magnetic force is amply sufficient for jointly effecting these functions for the machining of the above-mentioned relatively soft material.

The contour of the template may be designed as a closed curve in order to automatically return the tracer to its starting position after the completion of a cutting run. A modified template of such a design is illustrated in Fig. 3. The two parallel portions 2 and 3 of the template channel structure 1 have respective openings 12 and 13 of identical shape. The tracer member 4 (shown in broken lines) performs the described tool-controlling operation when rolling along the contoured edge portion of each opening and thereafter travels back to its starting position when rolling along the opposite straight edge portion of the opening.

For increasing the frictional forces at the points of engagement between the tracer member 4 and the template, the tracer pin 4 may have a portion designed as a frictional roller. For instance, as shown in Fig. 4, the edge of the template or pattern plate 2 may be tapered to a wedge shape. The corresponding portion 14 of the tracer pin 4 is given a double-cone shape and may have ridges to provide for increased friction.

A device according to the invention may be arranged vertically or horizontally. For applications in which the forces required for moving the tool support and providing the tool pressure are larger than can conveniently be provided by the magnetic force acting in the tracer device, the movements of the tracer along the pattern contour may be transmitted to a separately driven tool support by any of the known or customary transmission systems available for tracer-controlled or duplicating-type machine tools.

It will also be obvious to those skilled in the art upon a study of this disclosure that a tracer device according to the invention may be modified with respect to various components and details and hence may be embodied in apparatus other than those specifically illustrated and described, without departing from the essence of my invention and within the scope of the claims annexed hereto.

I claim:

1. A tracer device for contour machining, comprising a stationary template member having two mutually spaced and parallel pattern plates with mutually congruent contours corresponding to that desired of a work piece to be machined, a tracer member extending perpendicularly to said plates and engaging said contours at two points of the tracer, said tracer member being movable along said contours, tool control means connected with said tracer member for controlling the tool movement in accordance with the tracer movement, and magnetic means having a flux path extending through said tracer member and said template member for magnetically forcing said tracer member against said contours, said magnetic means having an electromagnet coil mounted on one of said members.

2. In a device according to claim 1, said template member consisting of a channel structure of magnetizable material having a substantially U-shaped cross section, said two plates being formed by the two parallel portions of the channel structure.

3. In a device according to claim 1, each of said plates having an opening with an edge fully closed upon itself, and said contour forming a portion of said edge, whereby said edge provides a closed guide path for automatic return of said tracer member.

References Cited in the file of this patent

UNITED STATES PATENTS

| Number | Name | Date |
|---|---|---|
| 1,195,293 | Townsend | Aug. 22, 1916 |
| 2,025,082 | Anderson et al. | Dec. 24, 1935 |
| 2,314,250 | Smith et al. | Mar. 16, 1943 |
| 2,378,021 | Lobosco | June 12, 1945 |